US006973311B2

(12) United States Patent
Yi-Bing et al.

(10) Patent No.: US 6,973,311 B2
(45) Date of Patent: Dec. 6, 2005

(54) SERVING RADIO NETWORK CONTROLLER RELOCATION IN RADIO TELECOMMUNICATION SYSTEM

(75) Inventors: Lin Yi-Bing, Tao Yuan Shien (TW); Tsai Hsien-Ming, Tao Yuan Shien (TW); Pang Ai-Chun, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 350 days.

(21) Appl. No.: 10/353,044

(22) Filed: Jan. 29, 2003

(65) Prior Publication Data

US 2004/0203754 A1  Oct. 14, 2004

(30) Foreign Application Priority Data

Oct. 1, 2002  (TW) .............................. 91122602 A

(51) Int. Cl.[7] ............................ H04Q 7/20; H04Q 7/00
(52) U.S. Cl. .................... 455/436; 455/439; 455/422.1; 455/424; 455/438; 455/456.1; 455/456.5; 370/331; 370/337; 370/338
(58) Field of Search ................................ 455/436, 439, 455/422.1, 424, 438, 524, 404.2, 456.1, 456.5; 370/331, 337, 338

(56) References Cited

U.S. PATENT DOCUMENTS

| | | | |
|---|---|---|---|
| 6,845,095 B2 * | 1/2005 | Krishnarajah et al. ...... 370/349 |
| 2002/0064144 A1 * | 5/2002 | Einola et al. ................ 370/335 |
| 2002/0089949 A1 * | 7/2002 | Bjelland et al. ............ 370/331 |
| 2002/0126636 A1 * | 9/2002 | Chen .......................... 370/329 |
| 2002/0150084 A1 * | 10/2002 | Lee et al. ................... 370/352 |
| 2002/0181468 A1 * | 12/2002 | Lucidarme et al. ...... 370/395.2 |
| 2003/0003919 A1 * | 1/2003 | Beming et al. ............. 455/446 |
| 2003/0013446 A1 * | 1/2003 | Haumont et al. ........... 455/436 |
| 2003/0021256 A1 * | 1/2003 | Lee ............................ 370/342 |
| 2003/0039232 A1 * | 2/2003 | Casati et al. ................ 370/337 |
| 2003/0073437 A1 * | 4/2003 | Yuen .......................... 455/432 |

* cited by examiner

*Primary Examiner*—Lester G. Kincaid
*Assistant Examiner*—Huy Phan
(74) *Attorney, Agent, or Firm*—Troxell Law Office, PLLC

(57) ABSTRACT

The present invention relates to a method of relocating a serving radio network controller (RNC) in a radio telecommunication system for switching a first RNC which is assigning radio and network resources to a user equipment (UE) to a second RNC replacing the first RNC for assigning radio and network resources to the UE continuously. The radio telecommunication system also comprises a core network which comprises a plurality of serving GPRS support node (SGSN). The first RNC is coupled to a first SGSN of the plurality of SGSNs. The second RNC is coupled to a second SGSN of the plurality of SGSNs. The method of the invention mainly performs the routing path switch between the SGSN and the RNC in the SGSN level, and is used in two modes: intra-SGSN mode and inter-SGSN mode.

9 Claims, 3 Drawing Sheets

SERVING RADIO NETWORK CONTROLLER RELOCATION IN RADIO TELECOMMUNICATION SYSTEM

FIELD OF THE INVENTION

The present invention relates to a relocation method of a Serving Radio Network Controller in a radio telecommunication system. This method is used for switching a first radio network controller (RNC) which is assigning radio and network resources to a user equipment (UE) to a second RNC replacing the first RNC for assigning radio and network resources to the UE continuously.

BACKGROUND OF THE INVENTION

Universal Mobile Telecommunication System (UMTS) is one of the standard of the third generation mobile communication system. The wireless access technology uses the Wideband Code Division Multiple Access (WCDMA). And the core network uses the structure of the Global System for Mobile Communication/General Packet Radio Service (GSM/GPRS).

Please refer to FIG. 1, FIG. 1 shows the structure of the UMTS 1 according to the prior art. The UMTS 1 comprises a core network (CN) 2, a plurality of radio access networks (RANs) and a user equipment (UE) 10. For the conveniences, there are only three RANs 3, 4, 5 shown in FIG. 1. There are a gateway GPRS service node (GGSN) 22 and a plurality of serving GPRS support nodes (SGSNs) in the CN 2. For the conveniences, only two SGSNs 241, 242 are shown in FIG. 1. The GGSN 22 is used to control the access of the packets in UMTS 1. And SGSN (e.g. SGSN 241 and SGSN 242) is used to track the location of UE 10. Also when UE 10 communicates with others, SGSN establishes the session with UE 10 through the RANs for exchanging packets between the SGSNs and the UE 10.

Each of the RANs comprises a radio network controller (RNC) and a plurality of base transceiver stations (BTS). The BTS provides radio resources, and the RNC assigns the radio resources provided by the BTS. In the RAN 3, for example, the RNC 32 controls the BTS 341 and BTS 342. Notice in FIG. 1, when the UE 10 communicates with others, the RNC 32 is in charge of assigning the radio resources that are provided by the BTS 342 to serve the UE 10 in the service area of the RAN 3. Thus the RNC 32 is called the serving radio network controller (SRNC) of UE 10.

When the UE 10 communicates with others outside from the UMTS 1, if the UE 10 moves from the RAN 3 to the RAN 4, the SRNC of UE 10 must be switched from the RNC 32 to the RNC 42. That means the authority for radio and network resource assignment is transferred from the RNC 32 to the RNC 42. The authority transfer process for assigning resources to the UE from a source RNC to a target RNC is called SRNC relocation. The details of the UMTS structure and the prior art for SRNC relocation are described in the technical specification of 3GPP TS 23.060 V5.1.0 (March, 2002) issued by The 3rd Generation Partnership Project (3GPP).

According to 3GPP TS 23.060 V5.1.0 manual, followings describe SRNC relocation from the RNC 42 to the RNC 52 (abbreviated as the first prior art). In the first prior art, the RNC 42 activates the SRNC relocation process. Next, the RNC 42 has the message transmission through the SGSN 241 and SGSN 242 to the RNC 52 to assigns radio and network resources so as to continue serving the UE 10. Then the RNC 42 commits the authority of serving the UE 10 to the RNC 52. It must be noticed that the RNC 42 temporarily stops the packet transmission with the UE and transfers the packets to the RNC 52. The RNC 42 notices GGSN 22 that the packet routing path between SGSN 241 and RNC 42 is updated to the routing path between SGSN 242 and RNC 52. Finally, the packet transmission between the RNC 52 and the UE 10 is recovered, and the SRNC relocation process is completed. The first prior art can support lossless transmission, but the packet transmission must be stopped. Therefore, the first prior art can't satisfy the need of real-time transmission.

In order to support real-time transmission, 3GPP issued two improved methods of SRNC relocation in 3GPP TR 25.936 V4.0.1 (December, 2001). One is packet duplication (abbreviated as the second prior art), and the other one is core network bi-casting (abbreviated as the third prior art). The second prior art is almost the same as the first prior art. The difference is that when the RNC 42 commits its authority of serving the UE 10 to the RNC 52, the RNC 42 doesn't temporarily stop the packet transmission with the UE 10, but duplicates the packet transmission to the RNC 52 until GGSN 22 updates the packet routing path from between the SGSN 241 and the RNC 42 to between the SGSN 242 and the RNC 52.

The third prior art is similar to the second prior art. The difference is that the packet duplication of the second prior art proceeds in a RNC. The packet duplication of the third prior art proceeds in a core network, such as GGSN or SGSN. After the packet data for transmitting to the UE are duplicated in a core network, the packet data are simultaneously transmitted to the RNC 42 and RNC 52. Because both the second and the third prior art use packet duplication for the SRNC relocation, network and radio resources are additionally exhausted. Besides, the UE may repeatedly receive the packets from the RNC 42 and RNC 52, so the UE has to process the function of dealing with the double packet.

SUMMARY OF THE INVENTION

It is therefore a primary objective of the present invention to provide a method of serving radio network controller (SRNC) relocation in a radio telecommunication system.

The present invention provides a method of relocating a serving radio network controller (RNC) in a radio telecommunication system for switching a first RNC which is assigning radio and network resources to a user equipment (UE) to a second RNC replacing the first RNC for assigning radio and network resources to the UE continuously.

In a preferred embodiment, the radio telecommunication system also comprises a core network (CN) which comprises a plurality of serving GPRS support node (SGSN). The first RNC is coupled to a first SGSN of the plurality of SGSNs, and the second RNC is coupled to a second SGSN of the plurality of SGSNs. For the intra-SGSN SRNC relocation process, at the first RNC, activate the process and send a Relocation Required Message to the first SGSN. The Relocation Required Message comprises a Target ID which represents the second RNC. Next, at the first SGSN, determine whether the first SGSN and the second SGSN are the same SGSN based on the target ID. If YES, at the first SGSN, send a Relocation Request Message to the second RNC. And the second RNC assigns radio and network resources to the UE according to the Relocation Request Message. Then at the second RNC, send a Relocation Request Acknowledge Message to the first SGSN. Next, at the first SGSN, switch a first routing path between the first RNC and the first SGSN to a second routing path between the second RNC and the first SGSN. Then, at the first SGSN, send a Relocation Command Message to the first RNC. And, at the first RNC, send a Relocation Commit Message to the second RNC. Finally, proceed the follow-up uplink and downlink process. The second RNC serves the UE.

In another preferred embodiment, the radio telecommunication system also comprises a core network (CN) which comprises a gateway GPRS service node (GGSN) and a plurality of serving GPRS support node (SGSN) which each is coupled to the GGSN, respectively. The first RNC is coupled to a first SGSN of the plurality of SGSNs. The second RNC is coupled to a second SGSN of the plurality of SGSNs. For the inter-SGSN SRNC relocation process, at the first RNC, activate the relocation process. At the first RNC, send a Relocation Required Message to the first SGSN. The Relocation Required Message comprises a target ID. The target ID represents the second RNC. At the first SGSN, determine whether the relocation is inter-SGSN SRNC relocation based on the target ID. If YES, which means that the first SGSN and second SGSN are not the same SGSNs, at the first SGSN, send a Forward Relocation Request Message to the second SGSN. And at the second SGSN, send a Relocation Request Message to the second RNC. According to the Relocation Request Message, the second RNC assigns radio and network resources to the UE. Then, at the second RNC, send a Relocation Request Acknowledge Message to the second SGSN. Next, at the second SGSN, send an Update Context Request Message to a GGSN. At the GGSN, switch a first routing path between the first RNC and the first SGSN to a second routing path between the second RNC and the second SGSN based on the Update Context Request Message. After switching over, send an Update Context Response Message to the second SGSN at the GGSN. Then send a Forward Relocation Response Message to the first SGSN at the second SGSN. At the first SGSN, send a Relocation Command Message to the first RNC. At the first RNC, send a Relocation Commit Message to the second RNC. Finally, proceed follow-up uplink process and downlink process. The second RNC serves the UE.

It is the advantages of the present invention that the packet transmission to the serving UE in the radio telecommunication system can be real-time, and packet duplication is not necessary in the method. Therefore the method doesn't exhaust additional network resources like the prior arts and the function of dealing with duplicated packets in the UE can be avoided.

These and other objectives of the presentation invention will no doubt become obvious to those of ordinary skill in the art after reading the following detailed description of the preferred embodiments with the appended drawings.

BRIEF DESCRIPTION OF THE APPENDED DRAWINGS

DETAILED DESCRIPTION OF THE INVENTION

Figure 1:
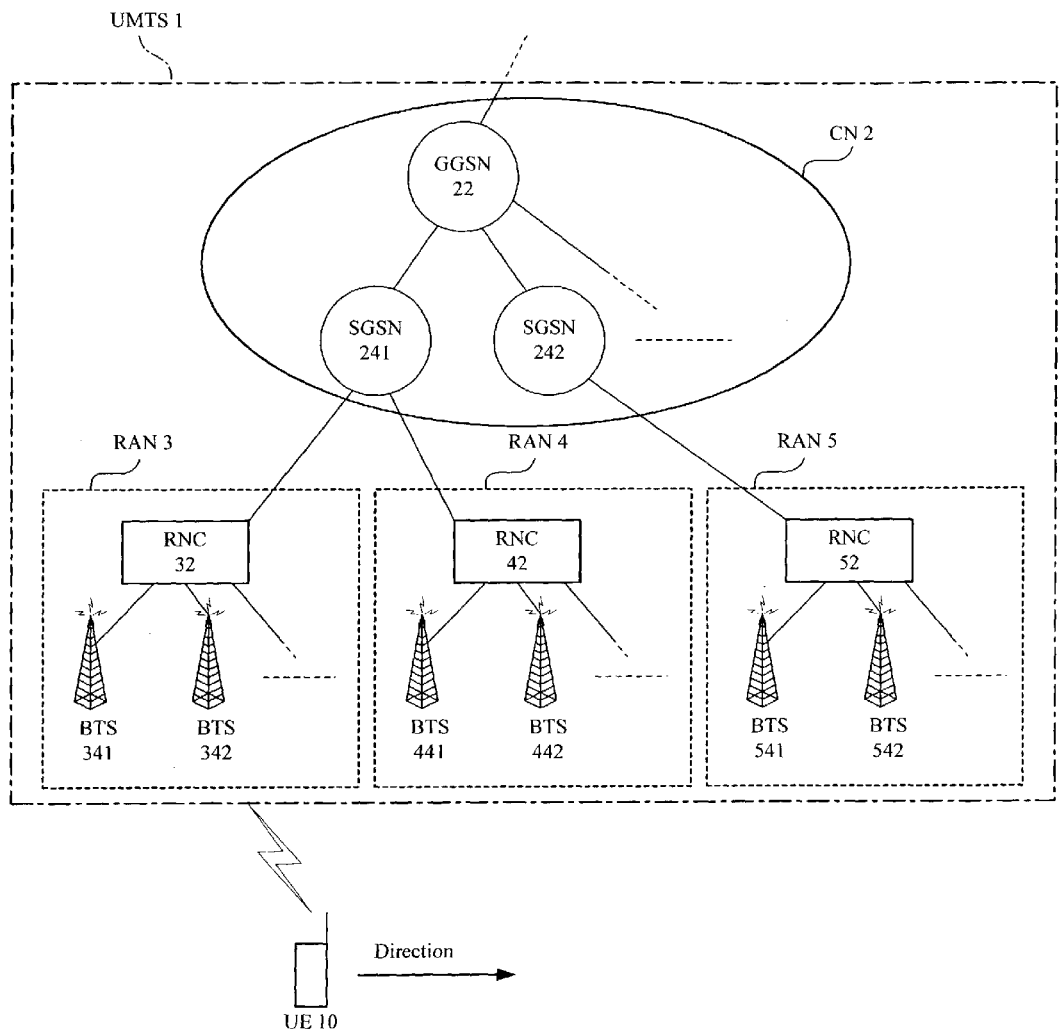
FIG. 1 shows the structure of the UMTS according to the prior art.

This present invention provides a method of relocating a serving radio network controller (SRNC) in a radio telecommunication system. The structure of the radio telecommunication system is a Universal Mobile Telecommunication System (UMTS) as shown in FIG. 1. The radio telecommunication system comprises a core network and a plurality of radio access networks (RANs). The radio telecommunication system also comprises the structure formed by GGSN, SGSN, RNC and BTS.

One of the features of the present invention is to perform the routing path switch between the SGSN and the RNC in the SGSN level. Thus the process involves two different types of the switch processes. In the first type, when switching from a first RNC to a second RNC in which the first RNC and the second RNC are coupled to the same SGSN, e.g. switching from the RNC 32 to the RNC 42 shown in FIG. 1, the RNC switch process is called as an intra-SGSN SRNC relocation process. In the second type, when switching from a first RNC to a second RNC in which the first RNC and the second RNC are coupled to different SGSNs respectively, e.g., switching from the RNC 42 to the RNC 52 shown in FIG. 1, the RNC switch process is called as an inter-SGSN SRNC relocation process. The following paragraphs will describe the preferred embodiments of the present invention specifically to understand the features, spirits, advantages and conveniences in the above two different types of switch processes.

Figure 2:
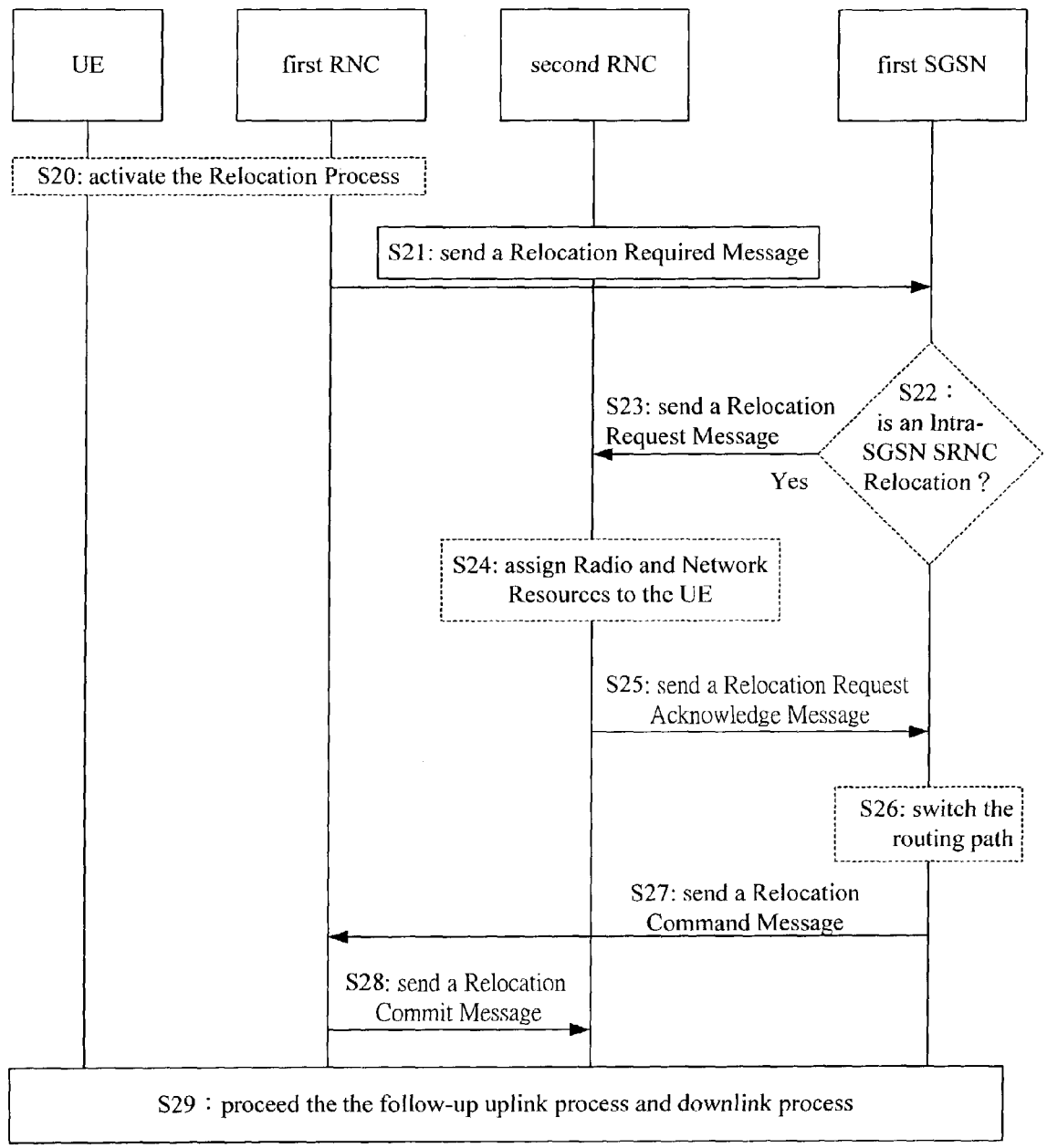
FIG. 2 shows a message flow chart of the intra-SGSN SRNC relocation according to the first preferred embodiment of the present invention.

Please refer to FIG. 2, FIG. 2 is the message flow chart of the SRNC relocation method according to the first preferred embodiment of the present invention. The first preferred embodiment is for the intra-SGSN SRNC relocation process. The intra-SGSN SRNC relocation process of the present invention comprises the following steps:

Step S20: at the first RNC, activate the relocation process. This process is activated by the detection by the first RNC. The first RNC detects a gradual movement of the UE from its specific serving area to the serving area of the second RNC, the first RNC being coupled to a first SGSN of the core network;

Step S21: at the first RNC, send a Relocation Required Message to the first SGSN. The Relocation Required Message comprises a target ID which represents the second RNC, the second RNC being coupled to the second SGSN;

Step S22: at the first SGSN, based on the target ID, determine whether the first SGSN and the second SGSN are the same SGSN by judging whether switching from the first SGSN to the second RNC is the intra-SGSN SRNC relocation. If yes, performing step S23;

Step S23: at the first SGSN, send a Relocation Request Message to the second RNC;

Step S24: at the second RNC, according to the Relocation Request Message, the second RNC assigns radio and network resources to the UE;

Step S25: at the second RNC, send a Relocation Request Acknowledge Message to the first SGSN;

Step S26: at the CN, based on the Relocation Request Acknowledge Message, switch a first routing path between the first RNC and the first SGSN to a second routing path between the second RNC and the first SGSN;

Step S27: at the first SGSN, send a Relocation Command Message to the first RNC;

Step S28: at the first RNC, send a Relocation Commit Message to the second RNC in response to the Relocation Command Message for ensuring that the authority of assigning resources has completely removed from the first RNC to the second RNC;

Step S29: proceed following uplink process and downlink process, the second RNC assigning radio and network resources to the UE continuously.

Figure 3:
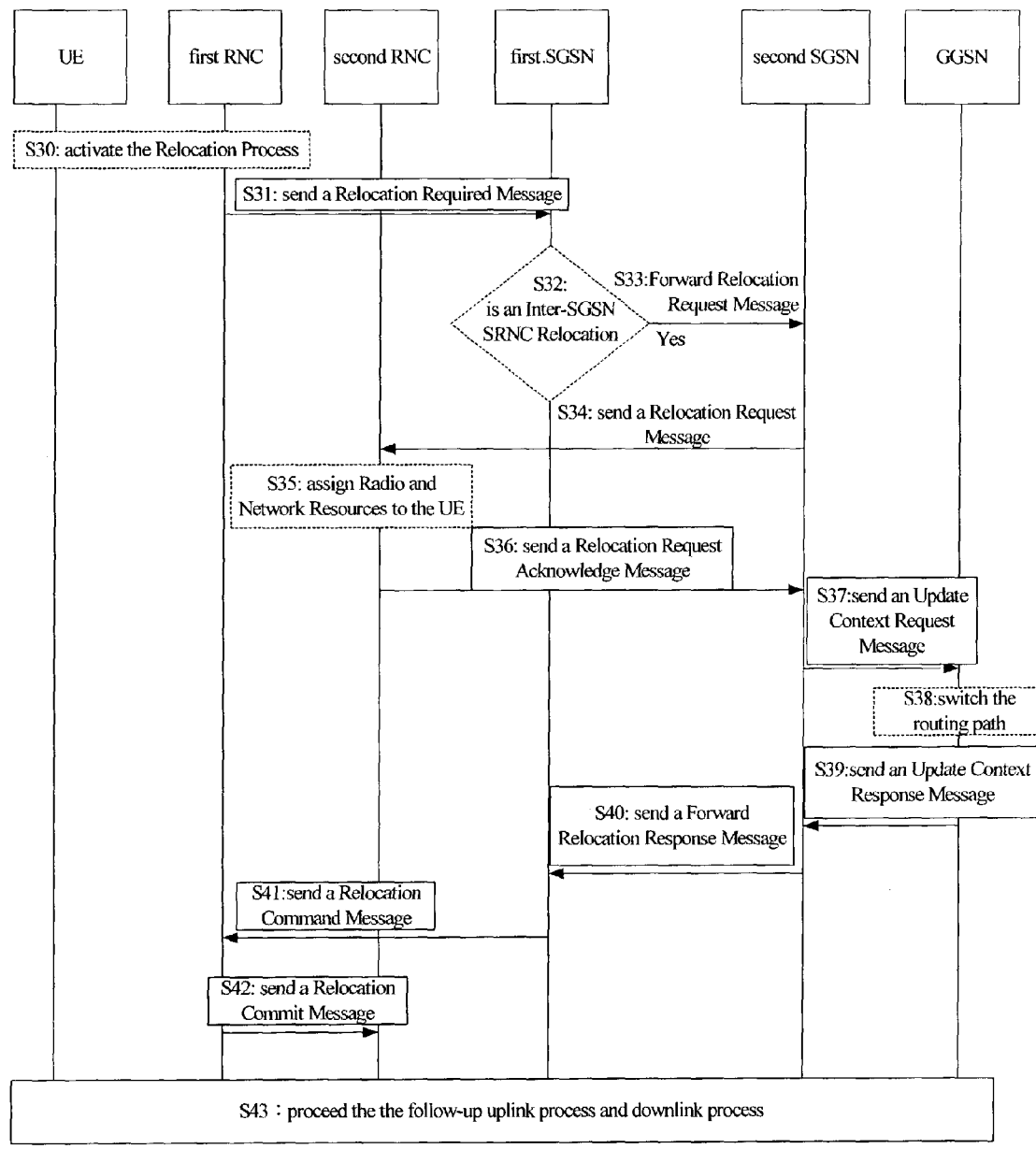
FIG. 3 shows a message flow chart of the inter-SGSN SRNC relocation according to the second preferred embodiment of the present invention.

Please refer to FIG. 3, FIG. 3 shows a message flow chart of the inter-SGSN SRNC relocation according to the second preferred embodiment of the present invention. The second preferred embodiment is for the inter-SGSN SRNC relocation process. The inter-SGSN SRNC relocation process of the present invention comprises the following steps:

Step S30: at the first RNC, activate the relocation process, this process is activated by the detection by the first RNC. The first RNC detects a gradual movement of the UE from its specific serving area to the serving area of the second RNC, the first RNC being coupled to a first SGSN of the core network;

Step S31: at the first RNC, send a Relocation Required Message to the first SGSN. The Relocation Required Message comprises a target ID which represents the second RNC, the second RNC being coupled to the second SGSN;

Step S32: at the first SGSN, based on the target ID, determine whether the first SGSN and the second SGSN are different SGSNs which means judging whether switching from the first SGSN to the second RNC is the inter-SGSN SRNC relocation. If yes, the first SGSN and the second SGSN are not the same SGSNs, and it is the inter-SGSN SRNC relocation, go to Step S33;

Step S33: at the first SGSN, send a Forward Relocation Request Message to the second SGSN;

Step S34: at the second SGSN, send a Relocation Request Message to the second RNC;

Step S35: at the second RNC, according to the Relocation Request Message, the second RNC assigns radio and network resources to the UE;

Step S36: at the second RNC, send a Relocation Request Acknowledge Message to the second SGSN;

Step S37: at the second SGSN, send an Update Context Request Message to the GGSN;

Step S38: at the GGSN, based on the Update Context Request Message, switching a first routing path between the first RNC and the first SGSN to a second routing path between the second RNC and the second SGSN;

Step S39: at the GGSN, send an Update Context Response Message to the second SGSN;

Step S40: at the second SGSN, send a Forward Relocation Response Message to the first SGSN;

Step S41: at the first SGSN, send a Relocation Command Message to the first RNC; and Step S42: at the first RNC, send a Relocation Commit Message to the second RNC in response to the Relocation Command Message for ensuring that the authority of assigning resources has completely removed from the first RNC to the second RNC.

Step S43: proceed the following uplink process and downlink process, the second RNC assigning radio and network resources to the UE continuously.

To sum up the features and advantages of the present invention, as the followings:

(a) In contrast to the prior art, the relocation process of serving radio network controller in this present invention starts from that the RNC detects the UE, and switching the routing path between the SGSN and the RNC within SGSN and GGSN of the core network;

(b) In the method of the present invention, the packet transmission to the active UE in the radio telecommunication system can be real-time;

(c) Packet duplication is not necessary in the method of the present invention. Therefore, the present invention does not exhaust additional network resources, and the function of dealing with duplicated packets in the UE can be avoided.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method of relocating a serving radio network controller (RNC) in a radio telecommunication system, when a first RNC detects a user equipment (UE) move out of service area of the first RNC, to switch the first RNC which is assigning radio and network resources to the UE to a second RNC replacing the first RNC for assigning radio and network resources to the UE continuously, said radio telecommunication system also comprising a core network (CN) which comprises a plurality of serving GPRS support node (SGSN), the first RNC being coupled to a first SGSN of the plurality of SGSNs, the second RNC being coupled to a second SGSN of the plurality of SGSNs, said method comprising the steps of:

at the first RNC, sending a Relocation Required Message to the first SGSN, the Relocation Required Message comprising a target ID which represents the second RNC;

at the first SGSN, based on the target ID of the Relocation Required Message, determining whether the first SGSN and the second SGSN are the same SGSN, when YES, performing the following steps:

at the first SGSN, sending a Relocation Request Message to the second RNC;

according to the Relocation Request Message, the second RNC assigning radio and network resources to the UE;

at the second RNC, sending a Relocation Request Acknowledge Message to the first SGSN;

at the CN, based on the Relocation Request Acknowledge Message, switching a first routing path between the first RNC and the first SGSN to a second routing path between the second RNC and the first SGSN;

at the first SGSN, sending a Relocation Command Message to the first RNC; and at the first RNC, sending a Relocation Commit Message to the second RNC.

2. The method according to claim 1, wherein said radio telecommunication system is a universal mobile telecommunications system (UMTS).

3. A method of relocating a serving radio network controller (RNC) in a radio telecommunication system, when a first RNC detects a user equipment (UE) move out of service area of the first RNC, to switch the first RNC which is assigning radio and network resources to the UE to a second RNC replacing the first RNC for assigning radio and network resources to the UE continuously, said radio telecommunication system also comprising a core network (CN) which comprises a gateway GPRS service node (GGSN) and a plurality of serving GPRS support node (SGSN) which each is coupled to the GGSN respectively, the first RNC being coupled to a first SGSN of the plurality of SGSNs, said second RNC being coupled to a second SGSN of the plurality of SGSNs, said method comprising the steps of:
   at the first RNC, sending a Relocation Required Message to the first SGSN, the Relocation Required Message comprising a target ID which represents the second RNC;
   at the first SGSN, based on the target ID of the Relocation Required Message, determining whether the first SGSN and the second SGSN are the same SGSN, when NO, performing the following steps:
   at the first SGSN, sending a Forward Relocation Request Message to the second SGSN;
   at the second SGSN, sending a Relocation Request Message to the second RNC;
   according to the Relocation Request Message, the second RNC assigning radio and network resources to the UE;
   at the second RNC, sending a Relocation Request Acknowledge Message to the second SGSN;
   at the second SGSN, sending an Update Context Request Message to the GGSN;
   at the GGSN, based on the Update Context Request Message, switching a first routing path between the first RNC and the first SGSN to a second routing path between the second RNC and the second SGSN;
   at the GGSN, sending an Update Context Response Message to the second SGSN;
   at the second SGSN, sending a Forward Relocation Response Message to the first SGSN;
   at the first SGSN, sending a Relocation Command Message to the first RNC; and
   at the first RNC, sending a Relocation Commit Message to the second RNC.

4. The method according to claim 3, wherein said radio telecommunication system is a universal mobile telecommunications system (UMTS).

5. A radio telecommunication system, comprising:
   a core network (CN) which comprises a plurality of serving GPRS support nodes (SGSNs) for tracking a location of a user equipment (UE);
   a plurality of radio access networks (RANs) which each comprises a respective radio network controller (RNC), wherein a first RNC of the plurality of RNCs is coupled to a first SGSN of the plurality of SGSNs which the first RNC is assigning radio and network resources to the UE, and a second RNC of the plurality of RNCs is coupled to a second SGSN of the plurality of SGSNs; and
   wherein when the first RNC detects the UE move out of service area of the first RNC, said radio telecommunication system switches the first RNC to the second RNC replacing the first RNC for assigning radio and network resources to the UE continuously by performing the following steps:
   at the first RNC, sending a Relocation Required Message to the first SGSN, the Relocation Required Message comprising a target ID which represents the second RNC;
   at the first SGSN, based on the target ID of the Relocation Required Message, determining whether the first SGSN and the second SGSN are the same SGSN, when YES, performing the following steps:
   at the first SGSN, sending a Relocation Request Message to the second RNC;
   according to the Relocation Request Message, the second RNC assigning radio and network resources to the UE;
   at the second RNC, sending a Relocation Request Acknowledge Message to the first SGSN;
   at the CN, based on the Relocation Request Acknowledge Message, switching a first routing path between the first RNC and the first SGSN to a second routing path between the second RNC and the first SGSN;
   at the first SGSN, sending a Relocation Command Message to the first RNC; and
   at the first RNC, sending a Relocation Commit Message to the second RNC.

6. The radio telecommunication system according to claim 5, wherein the CN further comprises a gateway GPRS service node (GGSN) for controlling packets input and output said radio telecommunication system, and the GGSN is coupled to each SGSN respectively.

7. The radio telecommunication system according to claim 6, wherein said radio telecommunication system is a universal mobile telecommunications system (UMTS).

8. A radio telecommunication system, comprising:
   a core network (CN) which comprises a plurality of serving GPRS support nodes (SGSNs) for tracking a location of a user equipment (UE), the CN further comprising a gateway GPRS service node (GGSN) for controlling packets input and output said radio telecommunication system, each SGSN of the plurality of SGSNs being coupled to the GGSN respectively;
   a plurality of radio access networks (RAN) which each comprises a respective radio network controller (RNC), wherein a first RNC of the plurality of RNCs is coupled to a first SGSN of the plurality of SGSNs, the first RNC is assigning radio and network resources to the UE, and a second RNC of the plurality of RNCs is coupled to a second SGSN of the plurality of SGSNs; and
   wherein when the first RNC detects the UE move out of service area of the first RNC, said radio telecommunication system switches the first RNC to the second RNC replacing the first RNC for assigning radio and network resources to the UE continuously by performing the following steps:
   at the first RNC, sending a Relocation Required Message to the first SGSN, the Relocation Required Message comprising a target ID which represents the second RNC;
   at the first SGSN, based on the target ID of the Relocation Required Message, determining whether the first SGSN and the second SGSN are the same SGSN, when NO, performing the following steps:
   at the first SGSN, sending a Forward Relocation Request Message to the second SGSN;
   at the second SGSN, sending a Relocation Request Message to the second RNC;
   according to the Relocation Request Message, the second RNC assigning radio and network resources to the UE;
   at the second RNC, sending a Relocation Request Acknowledge Message to the second SGSN;
   at the second SGSN, sending an Update Context Request Message to the GGSN;
   at the GGSN, based on the Update Context Request Message, switching a first routing path between the first RNC and the first SGSN to a second routing path between the second RNC and the second SGSN;

at the GGSN, sending an Update Context Response Message to the second SGSN;

at the second SGSN, sending a Forward Relocation Response Message to the first SGSN;

at the first SGSN, sending a Relocation Command Message to the first RNC; and at the first RNC, sending a Relocation Commit Message to the second RNC.

9. The radio telecommunication system according to claim 8, wherein said radio telecommunication system is a universal mobile telecommunications system (UMTS).

* * * * *